United States Patent [19]

Reichert et al.

[11] Patent Number: 4,710,546

[45] Date of Patent: Dec. 1, 1987

[54] FIBRE-REINFORCED OR FILLED POLYPHENYLENE SULPHIDE CONTAINING TREATED ARAMIDE FIBERS

[75] Inventors: Karl-Heinz Reichert; Ingo Koschinski, both of Berlin, Fed. Rep. of Germany

[73] Assignee: Bayer Aktiengesellschaft, Leverkusen, Fed. Rep. of Germany

[21] Appl. No.: 917,599

[22] Filed: Oct. 9, 1986

Related U.S. Application Data

[62] Division of Ser. No. 753,385, Jul. 10, 1985, Pat. No. 4,657,945.

[30] Foreign Application Priority Data

Jul. 21, 1984 [DE] Fed. Rep. of Germany ....... 3426918

[51] Int. Cl.$^4$ ..................... C08G 69/48; C08L 77/10; C08K 9/02
[52] U.S. Cl. ..................... 525/420; 523/200
[58] Field of Search .......................... 525/420

[56] References Cited

U.S. PATENT DOCUMENTS

| | | | |
|---|---|---|---|
| 4,145,474 | 3/1979 | Kertscher et al. | 428/378 |
| 4,292,416 | 9/1981 | Shue et al. | 525/420 |
| 4,425,384 | 1/1984 | Brownscombe | 427/221 |
| 4,502,364 | 3/1985 | Zucker et al. | 428/373 |
| 4,528,335 | 7/1985 | Selby et al. | 525/420 |
| 4,657,945 | 4/1987 | Reichert et al. | 525/420 |

Primary Examiner—Herbert J. Lilling
Attorney, Agent, or Firm—Connolly and Hutz

[57] ABSTRACT

This invention relates to fibre-reinforced or filled polyphenylene sulphide and to a process for the production thereof.

4 Claims, No Drawings

FIBRE-REINFORCED OR FILLED POLYPHENYLENE SULPHIDE CONTAINING TREATED ARAMIDE FIBERS

This is a division of copending application Ser. No. 753,385 filed July 10, 1985, now U.S. Pat. No. 4,657,945.

This invention relates to fibre-reinforced or filled polyphenylene sulphides and to a process for the production thereof.

It is known to reinforce polyphenylene sulphides by incorporating carbon and glass fibres, for example, therein (Jp No. 56 004 654). In this process, the fibres are mechanically admixed with the polyphenylene sulphide during extruding or injection moulding. However, the properties of such reinforced materials are not always completely satisfactory in many cases.

It has now been found that the property spectrum of fiber-reinforced polyphenylene sulphide may be improved if chemically-activated fibres or fillers are present in the polymerisation reaction to produce polyphenylene sulphide.

Thus, the present invention relates to reinforced polyphenylene sulphide, which is characterised in that the polycondensation producing polyphenylene sulphide is carried out in the pesence of chemically-activated fibres or fillers.

Polycondensation for the production of polyphenylene sulphide may be carried out analogously to the processes known from U.S. Pat. Nos. 3,354,129; 3,876,592; 2,513,188; 2,538,941, DE-AS No. 24 53 749 and DE-OS Nos. 26 23 333.

In the production of the reinforced or filled polyphenylene sulphides according to the present invention, chemically-activated fibres and optionally fillers are added to the reaction solution containing the dihalobenzene, optionally a trihaloaromatic material, catalyst and solvent and polymerisation is then carried out.

The present invention also relates to a process for the production of optionally branched, reinforced polyarylene sulphides from:

(a) from 50 to 100 mol % of dihaloaromatic materials corresponding to the following general formula:

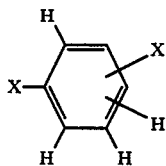

and from 0 to 50 mol % of dihaloaromatic materials corresponding to the following general formula:

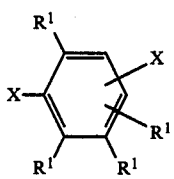

wherein,

X represents halogen, such as chlorine or bromine, in the meta- or para-position to each other; and $R^1$ independently represents hydrogen, alkyl, cycloalkyl, aryl, alkylaryl, arylalkyl, two ortho- radicals $R^1$ optionally being linked to produce an aromatic or heterocyclic ring and one radical $R^1$ always representing other than hydrogen;

(b) from 0 to 3 mol %, preferably from 0.1 to 2.9 mol %, more preferably from 0.4 to 2.4 mol %, based on the sum of the dihaloaromatic materials corresponding to general formulae (I) and (II), of a tri- or tetrahaloaromatic material corresponding to the following general formula:

$$ArX_n \qquad (III)$$

wherein

Ar represents an aromatic or heterocyclic radical;

X represents halogen, such as chlorine or bromine; and n represents 3 or 4; and (c) alkali metal sulphides, preferably sodium or potassium sulphide or a mixture thereof, preferably in the form of hydrates or aqueous mixtures, optionally together with alkali metal hydroxides, such as sodium and potassium hydroxides; the molar ratio of (a+b):c being from 0.85:1 to 1.15:1, in an organic solvent, optionally with the simultaneous use of catalysts and/or co-solvents, characterised in that chemically-activated fibres and optionally fillers are added to the reaction mixture and the reaction is carried out at a temperature of from 160° to 265° C., preferably from 165° C. to 250° C.

Normal quantities of conventional substances may be used as catalysts for this purpose, such as alkali metal fluorides and alkali metal carboxylates (DE-PS No. 2 453 749, U.S. Pat. No. 3,354,129). N,N-dialkylcarboxylic acid amides of $C_1$–$C_8$ aliphatic and $C_6$–$C_{12}$ aromatic carboxylic acids, for example, may be used in a quantity of from 0.02 to 1.0 mol, based on 1 mol of alkali metal sulphide, as co-solvents.

$R^1$ in general formula (II) preferably represents hydrogen, $C_1$–$C_{20}$ alkyl, $C_5$–$C_{20}$ cycloalkyl, $C_6$–$C_{24}$ aryl, $C_7$–$C_{24}$ aklyaryl or $C_7$–$C_{24}$ aralkyl. Moreover two radicals $R^1$ in the ortho-position to each other may form a condensed aromatic ring having a total of 6 carbon atoms or a condensed heterocyclic ring having 5 or 6 ring atoms and from 1 to 3 hetero atoms, such as N, O and S.

Ar preferably represents an aromatic radical having from 6 to 24 carbon atoms or a heterocyclic radical having from 6 to 24 ring atoms, most preferably an aromatic radical having from 6 to 10 carbon atoms or a heterocyclic radical having from 6 to 10 ring atoms, the heterocyclic radicals optionally containing up to 3 hetero atoms, such as N, S, O.

Alkali metal sulphides are used in normal quantities and in conventional manner and suitable examples are sodium and potassium sulphide. Alkali metal sulphides may also be used which are produced from hydrogen sulphides with alkali metal hydroxides, such as NaOH and KOH. In each case, mixtures of sulphides and hydroxides may be used.

The alkali metal sulphides may be dehydrated in one or more stages, such as by distilling off the water from the reaction solution in conventional manner. In the process according to the present invention, dehydration need not be complete. Partial dehydration may take place, for example, before addition of the dihalogen compounds corresponding to the general formulae (I) and (II).

N,N-dialkyl carboxylic acid amides, which are optionally used as co-solvents, are preferably used before the alkali metal sulphides are dehydrated. However, it is also possible to introduce the co-solvents, together with the polyhalogen compounds, to the dehydrated reaction mixture.

The addition of the components may be in any order. The dihaloaromatic materials corresponding to general formulae (I) and (II) and the tri- or tetra-haloaromatic materials corresponding to general formula (III) and the chemically-activated fibres and optionally fillers may be added together or separately, continuously, in batches or directly in one batch to the alkali metal sulphide, the solvent or to a portion thereof. Thus, for example, alkali metal sulphide may be added together with the solvent or a portion thereof to compounds corresponding to general formulae (I), (II) and (III). All the components may also be directly added together. The components may also be added in any other combination.

Mixtures of meta- and para-dihaloaromatic materials corresponding to general formulae (I) or (II) may also be used according to the present invention. In this case, the molar ratio m:p may be at most 30:70.

p-dihaloaromatic materials are most preferably used to produce thermoplastically processible polyphenylene sulphides.

The following are examples of dihaloaromatic materials corresponding to general formula (I) which are used according to the present invention: p-dichlorobenzene, p-dibromobenzene, 1-chloro-4-bromobenzene, 1,3-dichlorobenzene and 1,3-dibromobenzene. They may be used on their own or in admixture with each other. 1,4-dichlorobenzene and/or 1,3-dibromobenzene are most preferably used.

The following are examples of dihaloaromatic materials corresponding to general formula (II) which are used according to the present invention: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dichloroxylene, 2,4-dibromocumene and 1-cyclohexyl-3,5-dichlorobenzene. They may be used on their own or in admixture with each other.

The following are examples of tri- or tetra-haloaromatic materials corresponding to general formula (III) which are used according to the present invention: 1,2,3-trichlorobenzene, 1,2,4-trichlorobenzene, 1,2,4-tribromobenzene, 1,3,5-trichloro-2,4,6-trimethylbenzene, 1,2,3-trichloronapthalene, 1,2,4-trichloronapthalene, 1,2,6-trichloronapthalene, 2,3,4-trichlorotoluene, 2,3,6-trichlorotoluene, 1,2,3,4-tetrachloronapthalene, 1,2,4,5-tetrachlorobenzene, 2,2'-4,4'-tetrachlorobiphenyl and 1,3,5-trichloro-triazine.

If branched polyarylene sulphides are to be produced, then at least 0.1 mol % of a tri- or tetra-haloaromatic material corresponding to general formula (III) has to be used.

The reaction according to the present invention takes place at a temperature of from 160° to 265° C., preferably from 165° to 250° C.

Chemically-activated fibres and optionally fillers are added to the reaction mixture. Pitch fibres (type P-M 104 T ®, Sigri/Meitingen), aramide fibres, such as Kevlar ® fibres (Du Pont), carbon fibres based on PAN (e.g. type SFC ®, laboratory product by Sigri/Meitingen), commercial glass fibres, commercial aluminum fibres (e.g. by Deutsche Nichimen GmbH), asbestos fibres, and suitable non-fibrous materials, such a glass powder, hollow glass spheres, graphite, carbon black, aluminium powder and aluminium platelets, may be used as fibres.

Furthermore, materials, such as silicates, alumosilicates (e.g. mica, asbestos, kaolin, talcum) calcium silicates inter alia (c.f. U.S. Pat. No. 4,425,384) may also be added on their own or in admixture as fillers.

The fibres may be activated by pre-treatment, such as by exposing them at an elevated temperature of from 150° to 500° C. to a halogen atmosphere, such as chlorine gas, bromine vapour, preferably chlorine gas. In this process, the fibres are introduced into a vessel, such as a glass tube, and heated in a tubular furnace, for example, under an inert gas atmosphere, such as $N_2$, and then halogen gas is passed through the tube for from about 1 to 4 hours, preferably 2 hours, optionally under elevated pressure.

These prepared fibres contain halogen which may be chemically-bound to the fibres. They are then added to the reaction solution to produce polyphenylene sulphide. During the reaction, the polyphenylene sulphide may optionally become attached to the fibre by chemical reaction.

Furthermore, the above additives may be activated by, for example, reaction with thionyl chloride, ozone. concentrated nitric and sulphuric acid (c.f. U.S. Pat. No. 4,425,384).

The reaction time may be up to 12 hours, preferably from 1 to 9 hours. It may be advantageous to raise the reaction temperature in stages during this time.

The reaction mixture is worked-up and the reinforced polyarylene sulphides are isolated in known manner.

The reinforced polyarylene sulphide may be directly separated from the reaction solution by conventional processes or only after addition of, for example, water and/or dilute acids (such as by filtration or centrifugation).

There is generally a washing operation with water after filtration to remove inorganic constituents which may adhere to the polymers (e.g. remains of alkali metal sulphides and alkali metal chlorides).

A washing or extraction with other washing liquids, which may also be carried out in addition to or subsequent to this washing, is, of course, also possible.

The reinforced polymer may also be obtained by drawing off the solvent from the reaction and subsequently washing it, as described above.

The reinforced polyarylene sulphides according to the present invention may also be mixed with other polymers, with pigments and fillers, such as graphite, metal powder, glass powder, quartz powder, glass fibres, additives conventionally used for polyarylene sulphides, such as stabilizers or mould agents, and mechanically admixed therewith.

The polyarylene sulphides according to the present invention may be used, for example, as an embedding composition for electrical components, sealing rings, parts of office equipment and telecommunications apparatus etc.

EXAMPLES

Example 1

Production of carbon fibre-containing polyphenylene sulphide (a) Chloriding of the surface of the carbon fibres. 45 g of pitch fibres by Sigri/Meitingen (P-M 104 T, ground, fibre length about 0.4 mm, fibre diameter about 14.5 μm) are filled into a glass tube of Duran and are heated to 400° C. in a tubular furnace under a stream of nitrogen. Chlorine gas is then passed through the fibre packaging under atmospheric pressure for about 2 hours. After cooling to room temperature and simultaneous purging with nitrogen, the activated fibre is used for the further reaction. Chlorine may be qualitatively traced on the surface of the fibres by EDS-measurements (EDS=energy dispersive system).

(b) Production of polyphenylene sulphide in the presence of the chlorinated carbon fibres 240 g of Na$_2$S.9-H$_2$O, 412 g of N-methylpyrrolidone and 25 g of chlorinated pitch fibres are placed in a round glass flask. The flask is then purged with N$_2$ and is slowly heated to 160° C. with stirring, the sodium sulphide thereby dissolving. A mixture of water and N-methyl-pyrrolidone (about 230 ml) is then distilled off over 1 hour via a distillation bridge. The solution is then cooled to about 80° C., the sodium hydrogen sulphide precipitating as a greyish brown solid. 150 g of 1,4-dichlorobenzene, dissolved in 500 ml of N-methylpyrrolidone, are added to the contents of the flask at this temperature and the reaction mixture is heated to 200° C. over a period of 3 hours. The reaction mixture is then stirred for 4 hours at 200° C. The entire reaction is carried out under an N$_2$ atmosphere. The reaction mixture is then cooled, the polymer and inorganic salts thereby precipitating. After the solid material has been filtered and washed with water and acetone, the polymer is dried in a vacuum chamber at 80° C. and under 40 Torr for 12 hours. Polymer yield is about 56% of the theoretical yield. Properties of fibre-free polyphenylene sulphide produced thereby:
M$_n$=about 3600 (end groups determined by chlorine analysis) M$_w$=about 54000 (light diffusion) Melting point=285° C. (DSC, heating rate 10° C./min)

Example 2

Production of aramide fibre-containing polyphenylene sulphide (a) Chloriding of the surface of the aramide fibres 4.5 g of Kevlar fibres (by Du Pont, cut, fibre length about 6 mm, fibre diameter about 14 μm) are filled into a glass tube of Duran and are heated to 200° C. in a tubular furnace under a stream of nitrogen. Chlorine gas is then passed through the fibre packaging under atmospheric pressure for about 1 hour. After cooling to room temperature and simultaneously purging with nitrogen, the activated fibres are used for the further reaction.

(b) Production of polyphenylene sulphide in the presence of the chlorinated aramide fibres. The experiment is carried out under an inert gas atmosphere (nitrogen). 240 g of Na$_2$S.9H$_2$O, 412 g of N-methylpyrrolidone and 4.5 g of chlorinated aramide fibres are placed in a round glass flask. The contents of the flask are then purged with N$_2$ and are slowly heated to 160° C. with stirring, the sodium sulphide thereby dissolving. A mixture of water and N-methylpyrrolidone (about 220 ml) are distilled off, via a distillation bridge over a period of 1 hour. The solution is then cooled to about 80° C. and 150 g of 1,4-dichlorobenzene, dissolved in 500 ml of N-methylpyrrolidone, are added to the contents of the flask at this temperature and the reaction mixture is heated to 200° C. over a period of 3 hours. The reaction mixture is stirred for 4 hours at 200° C. under an N$_2$ atmosphere. After the reaction mixture has been cooled, the fibre-containing polymer is worked-up as described in Example 1. Polymer yield is about 59% of the theoretical yield.

We claim:

1. A fiber-reinforced or filled polyphenylene sulphide containing chemically-actived fibers which have been activated by a pretreatment with bromine vapor, chlorine gas, thionyl chloride or ozone wherein the fibers pretreated are aramide fibers.

2. A process for the production of fiber-reinforced polyphenylene sulphides according to claim 1 which comprises reacting (a) from 50 to 100 mol % of dihaloaromatic materials corresponding to the following formula:

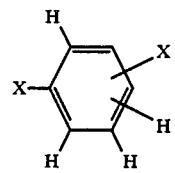

and from 0 to 50 mol % of dihaloaromatic materials corresponding to the following formula:

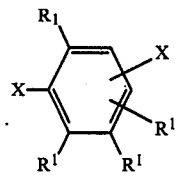

wherein
X represents halogens which are in the meta- or para-position to each other; and
R$^1$ independently represents hydrogen, alkyl, cycloalkyl, aryl, alkylaryl, arylalkyl, two ortho radicals R$^1$ optionally completing an aromatic or heterocyclic ring and one radical R$^1$ always representing other than hydrogen;

(b) from 0 to 3 mol %, based on the sum of the dihaloaromatic materials corresponding to (a) and (b), of a tri- or tetra-haloaromatic material corresponding to the following formula:

wherein
Ar represents an aromatic or heterocyclic radical;
X represents chloro or bromo;
n represents 3 or 4; and (c) alkali metal sulphides, the molar ratio of (a+b):c being from 0.85:1 to 1.15:1, in an organic solvent, in the presence of said chemically-activated aramide fibers and the reaction is carried out at a temperature of from 160° to 265° C.

3. The process according to claim 2 wherein the amount of tri- or tetra-haloaromatic material (b) is 0.1 to 2.9 mol percent based on the sum of materials (a) and (b).

4. The process according to claim 2 wherein the amount of tri- or tetra-haloaromatic material (b) is 0.4 to 2.4 mol percent.

* * * * *